(12) United States Patent
Mariotti

(10) Patent No.: US 9,697,507 B2
(45) Date of Patent: Jul. 4, 2017

(54) METHOD FOR USING A CAMERA PHONE TO ACQUIRE, STORE, MANAGE AND REDEEM DISCOUNT COUPONS

(75) Inventor: Andrea Mariotti, Menlo Park, CA (US)

(73) Assignee: RICOH CO., LTD., Tokyo (JP)

( * ) Notice: Subject to any disclaimer, the term of this patent is extended or adjusted under 35 U.S.C. 154(b) by 1684 days.

(21) Appl. No.: 12/048,877

(22) Filed: Mar. 14, 2008

(65) Prior Publication Data
US 2009/0234731 A1 Sep. 17, 2009

(51) Int. Cl.
| | |
|---|---|
| *G06Q 30/00* | (2012.01) |
| *G06Q 20/20* | (2012.01) |
| *G06Q 20/32* | (2012.01) |
| *G06Q 20/38* | (2012.01) |
| *G06Q 30/02* | (2012.01) |
| *G07G 1/00* | (2006.01) |

(52) U.S. Cl.
CPC ......... *G06Q 20/20* (2013.01); *G06Q 20/3227* (2013.01); *G06Q 20/387* (2013.01); *G06Q 30/02* (2013.01); *G06Q 30/0207* (2013.01); *G06Q 30/0267* (2013.01); *G07G 1/0081* (2013.01)

(58) Field of Classification Search
CPC ........... G06Q 30/0207; G06Q 30/0238; G06Q 30/0641
USPC .......................................................... 705/14
See application file for complete search history.

(56) References Cited

U.S. PATENT DOCUMENTS

| | | | |
|---|---|---|---|
| 5,424,524 A * | 6/1995 | Ruppert et al. | 705/17 |
| 5,923,735 A * | 7/1999 | Swartz et al. | 379/93.12 |
| 6,032,137 A * | 2/2000 | Ballard | 705/75 |
| 2002/0062251 A1 | 5/2002 | Anandan et al. | |
| 2003/0233276 A1* | 12/2003 | Pearlman | G06Q 20/3274 705/14.23 |
| 2004/0112958 A1* | 6/2004 | Rosica | G06Q 30/02 235/383 |
| 2006/0190331 A1 | 8/2006 | Tollinger et al. | |
| 2006/0194569 A1 | 8/2006 | Hsueh | |

OTHER PUBLICATIONS

Google AdWords Print Ads, "Prints Ads 2D Barcodes," <www.google.com/adwords/printads/ads/barcode/, Accessed Feb. 12, 2008.

* cited by examiner

*Primary Examiner* — Olabode Akintola
(74) *Attorney, Agent, or Firm* — Blakely, Sokoloff, Taylor & Zafman LLP

(57) ABSTRACT

A method, system and computer product for discount coupon acquisition, management and redemption. In one embodiment, the method comprises scanning a coupon with a portable computing device without establishing a data connection to the portable computing device. The method further comprises decoding a scanned image of the coupon for storage in the portable computing device, and generating information of the coupon by the portable computing device for redeeming the coupon.

22 Claims, 9 Drawing Sheets

METHOD FOR USING A CAMERA PHONE TO ACQUIRE, STORE, MANAGE AND REDEEM DISCOUNT COUPONS

TECHNICAL FIELD

Embodiments of the present invention relate to mobile computing, and more specifically, to the acquisition, management and redemption of discount coupons using a portable computing device that has a built-in camera and a display.

BACKGROUND

One of the most consolidated tools in direct marketing is the use of coupons. A problem with conventional paper coupons is that they are cumbersome, as well as a burden for consumers. A consumer has to find the coupons, collect the coupons and carry the coupons virtually at all times. At times, collecting the coupons may involve cutting them out of printed media, which can be inconvenient when a pair of scissors is not readily available. Further, coupons are generally of different shape, size, consistency, and have different expiration dates. A coupon that expires inside a wallet is of little or no value to consumers and retailers. Thus, a solution is needed for retaining the value of coupons to consumers (e.g., savings) and to retailers (e.g., generating buyers' traffic) while doing away with the clutter in the wallet.

U.S. Publication No. 20060194569 by Hsueh describes a process for delivering electronic coupons over a wireless network to a portable device. Based on a profile provided by a user, the process selects and sends coupons to the user via a data connection. Thus, the user has no control over which coupons are delivered to their devices.

U.S. Publication No. 20060190331 by Tollinger et al. describes a method for delivering advertising items to a client at a portable device. A user can use a web interface to select and download coupons over a network, and then perform coupon management locally. However, it is necessary for a user to have network connectivity when acquiring coupons. Additionally, a user has to manually locate a coupon at redemption time.

U.S. Publication No. 20030233276 by Pearlman et al. describes a technique that distributes and administers promotional offers by loading electronic coupons into a portable electronic device with a display. The technique uses barcodes to store tracking data, and relies on network connectivity to download coupons and to transmit user profile information. A retailer can scan a coupon on the display of the portable electronic device.

U.S. Publication No. 20020062251 by Anandan et al. describes a method for communicating with consumers using wireless technologies. The method facilitates the tracking of consumer movements within retail locations, collects responses by consumers regarding their experiences in these locations, and distributes location-specific marketing or promotional messages through the use of location-tracking technology and portable electronic communication devices. The method focuses on location-based services and assumes new and expensive infrastructure.

Existing techniques, as discussed above, generally rely on data connectivity for coupon acquisition. Some of the existing techniques may compromise consumers' privacy information. Further, some of the existing techniques are expensive to deploy and/or deviate from consumers' entrenched habit of browsing, selecting and collecting coupons printed on a piece of paper. Thus, there is a need to improve existing techniques for coupon acquisition, management and redemption.

SUMMARY OF THE INVENTION

A method, system and computer product for discount coupon acquisition, management and redemption. In one embodiment, the method comprises scanning a coupon with a portable computing device without establishing a data connection to the portable computing device. The method further comprises decoding a scanned image of the coupon for storage in the portable computing device, and generating information of the coupon by the portable computing device for redeeming the coupon.

BRIEF DESCRIPTION OF THE DRAWINGS

The present invention is illustrated by way of example, and not by way of limitation, in the figures of the accompanying drawings and in which.

DETAILED DESCRIPTION

Figure 1:
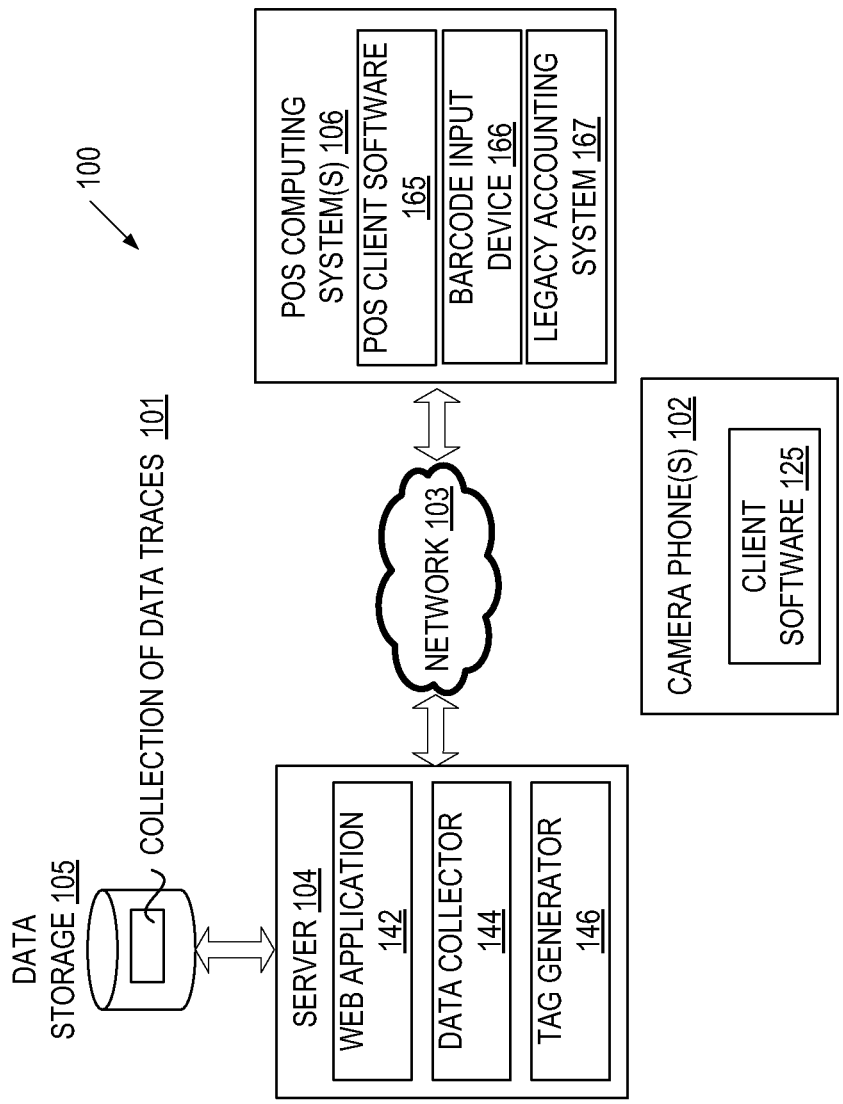
FIG. 1 illustrates a network architecture in which embodiments of the present invention may be implemented.

Described herein is a method, system and computer program product for using a portable computing device for coupon acquisition, managements and redemption. In one embodiment, the portable computing device is a camera phone. Embodiments of the invention utilize the computing power of camera phones to assist consumers in the acquisition, management and redemption of discount coupons. The consumer is in charge of which coupons he/she decides to acquire. It is not necessary for the camera phones to have data connectivity with an external system.

Embodiments of the present invention provide trusted and convenient access to coupon management for consumers. The tool for coupon collection and redemption is camera phones, which most consumers already possess. The techniques described herein are also consistent with the existing consumer behaviors of collecting coupons from printed media and redeeming them in the stores. Although the term "camera phone" is used throughout the description, it is understood that the term refers to any currently available or next-generation portable computing device that has a built-in camera and a display.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "acquiring", "scanning", "generating", "receiving", "decoding", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 includes one or more camera phones 102, a point-of-sale (POS) computing system 106 and a server 104. Although the term "camera phone" is used throughout the description, a person of ordinary skill in the art would appreciate that the camera phones 102 may include, for example, palm-sized computing devices, personal digital assistants (PDAs), and any next-generation portable computing devices having built-in camera and display functionalities. Each camera phone 102 installs client software 125 for acquiring, managing, and redeeming discount coupons. As will be described in greater detail below, the client software 125 may read, decode, generate new key and render traceable barcodes for redemption, as well as issue alerts of upcoming expiration dates. The client software 125 may be downloaded directly from the server 104, or through a computer (not shown) coupled to the server 104. Once the client software 125 is downloaded from the server 104, it is not necessary for the camera phones 102 to have data connectivity with the server 104.

In one embodiment, the POS computing system 106 resides in a store, where the redemption of discount coupons takes place. For a retail chain that has a number of store locations, the POS computing system 106 may reside in a central location accessible by all of the store locations. The POS computing system 106 installs POS client software 165 that receives inputs from a barcode input device 166 (e.g., a scanner) and extracts coupon data and tracing data from the input. The POS computing system 106 then passes the coupon data to a legacy accounting system 167 for calculating discounted prices as well as for other accounting purposes. The POS computing system 106 further passes the tracing data to the server 104 for consumer profiling, preference tracking and data mining. The POS computing system 106 is coupled to the server 104 via a network 103, which may be a public network (e.g., the Internet) or a private network (e.g., an Ethernet, a Local Area Network (LAN), or a corporate intranet), or a combination of both. Although only one POS computing system 106 is shown, it is understood that the network architecture 100 may include multiple POS computing systems 106, each residing in a store location or in a central location of a retail chain. It is also noted that the barcode input device 166 may be locally or remotely coupled to the POS computing system 106.

The server 104 provides client software 125 for the camera phones 102, and collects the tracing data from the POS computing system 106. The server 104 may also provide consumer profiling to authorized parties. The server 104 may contain a server front end responsible for network communications, plugins for server functions (such as web administration), a basic directory tree containing server-related data, and a database back end plugin responsible for managing the storage and retrieval of data. The server 104 stores a collection of tracing data 101 in data storage 105 for consumer profiling, preference tracking and data mining. The data storage 105 may comprise mass storage devices, such as magnetic or optical storage based disks or tapes.

In one embodiment, the server 104 may maintain a Web presence for access by the users of camera phones 102 and the POS computing system 106. The server 104 may host a Web application 142 to provide the users of camera phones 102 with the client software 125 download, and, in some scenarios, to register the users. The server 104 may include a data collector 144 to receive tracing data from the POS computing system 106 and to compute statistics based on the information in the tracing data. The statistics of the tracing data can be provided to the merchants who accept the discount coupons, the publishers who print the discount coupons, and other interested parties. In some embodiments, the server 104 may further include a tag generator 146 to receive an original barcode value associated with a discount coupon, and to convert it to a tag that uniquely identifies the discount coupon. The tag may be a barcode (e.g., a Universal Product Code (UPC) or a Quick Response (QR) barcode) that includes the original barcode value and additional information. Each tag can be linked to any information that can be used to evaluate the effectiveness of a marketing campaign. A publisher of discount coupons may access the tag generator 146, via a Web site hosted by the server 104, to convert their original barcode values into tags. The tags can be printed in an advertisement and can be scanned by the camera phone 102.

In alternative embodiments, the Web application 142, the data collector 144 and the tag generator 146 may be hosted by one or more separate servers, which are owned or maintained by one or more separate business entities.

Figure 2:
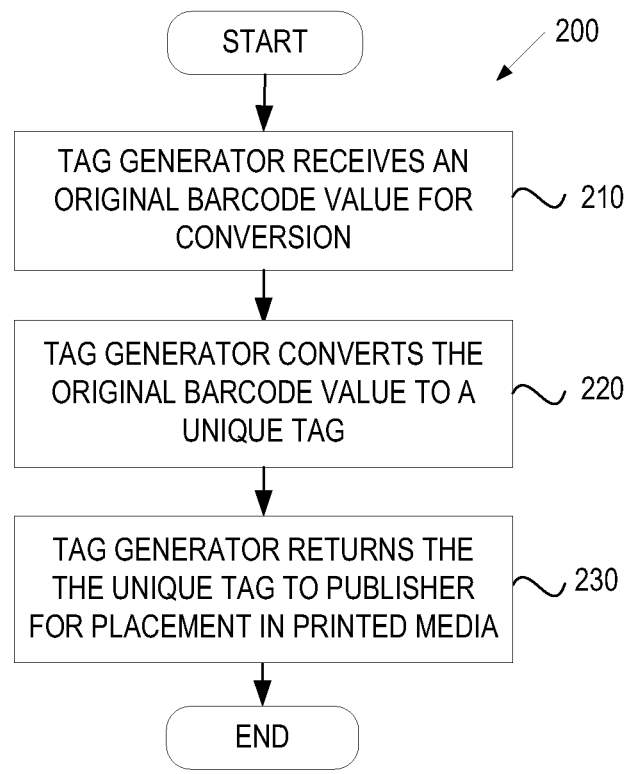
FIG. 2 illustrates a flow diagram of one embodiment of a process for converting an original barcode in a coupon to a tag.

FIG. 2 is a flow diagram illustrating a process 200 for converting an original barcode value into a unique tag. The process 200 may be performed by hardware (e.g., circuitry, dedicated logic, programmable logic, microcode, etc.), software (such as instructions run on a processing device), or a combination thereof. In one embodiment, the process 200 is performed by the tag generator 146 of FIG. 1, which may be located in the server 104 or another host that is accessible by a publisher of printed media that print discount coupons.

At block 210, the process 200 begins with the tag generator 146 receiving an original barcode value submitted by the publisher. An original barcode value is the value of the barcode that is printed on a conventional paper coupon. In addition to the original barcode value, the publisher may also submit the information that can be used to improve the effectiveness of the printed media or information related to consumer profiling. In one embodiment, the tag generator 146 may be accessible by the publisher online via a Web interface. At block 220, the tag generator 146 generates a unique tag to include all of the information submitted by the publisher. In one embodiment, the tag may include a logo that identifies the company (e.g., Ann's Wallet.com, an online service provider hosted by the server 104) offering the coupon management service described herein, and a barcode that includes all of the information submit by the publisher. An example of the tag will be shown in FIG. 3. At block 230, the tag generator 146 returns the tag to the publisher, and the publisher can place the tag in an advertisement.

Figure 3:
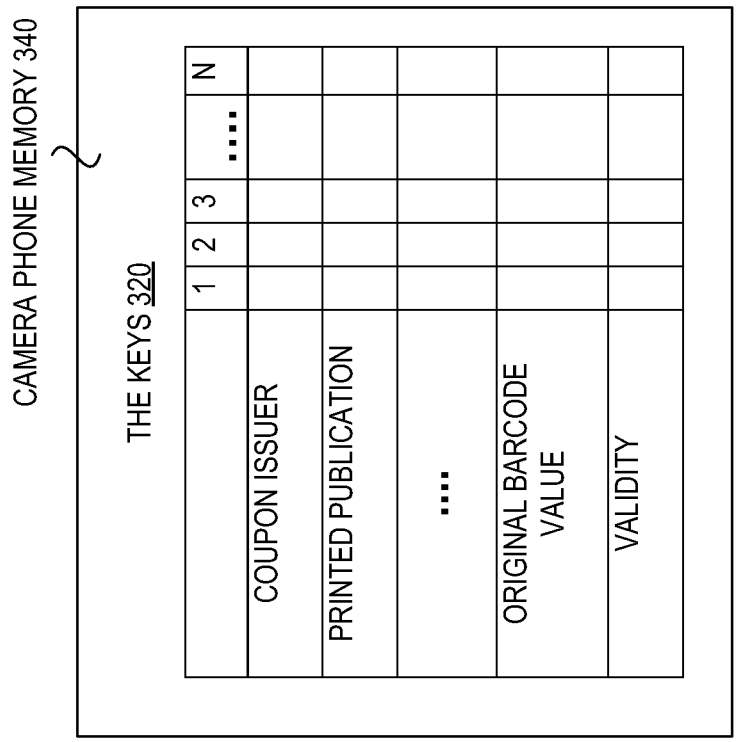
FIG. 3 illustrates an example of a tag and corresponding keys stored in the memory of a camera phone.
Figure 3:
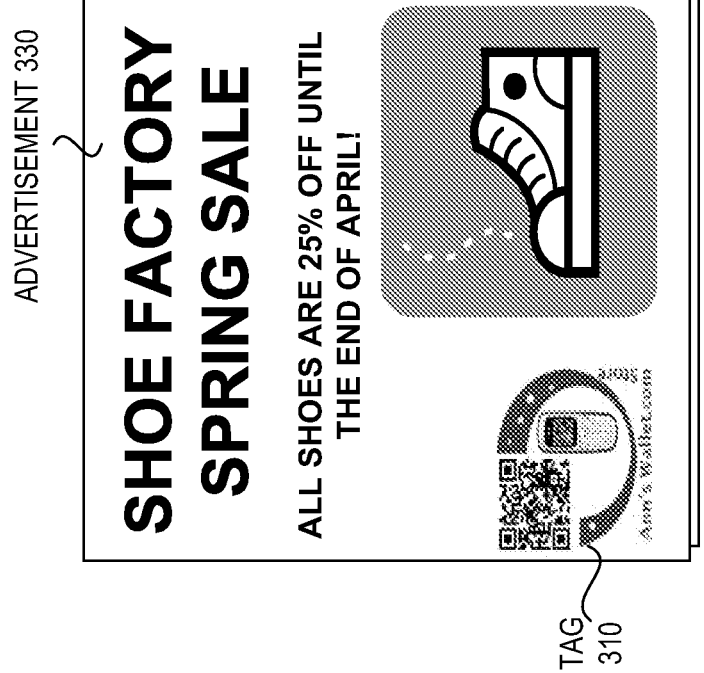

FIG. 3 illustrates an example of tag-to-key conversion performed by the client software 125. A publisher of an advertisement 330 places a tag 310 in the advertisement. The tag 310 includes a logo that identifies a company (e.g., Ann's Wallet.com) offering the coupon management service. The tag 310 also includes a two-dimensional barcode that includes an original barcode value and additional information that can be used to track a consumer's preference and effectiveness of the advertisement. After the camera phone 102 scans the tag 310 in the advertisement 330, the client software 125 of the camera phone 102 converts the tag into a key 320, and stores the key 320 in its memory 340. The camera phone memory 340 may store a plurality of keys 320 (N keys are shown). Each key 320 is a set of structured values that uniquely identifies the sales items to which a discount coupon apply, as well as information that can be used to evaluate the effectiveness of a marketing campaign. For example, each key 320 may include, but is not limited to, the name of coupon issuer (e.g., the business entity that sells merchandise), the publication that prints the coupon (e.g., a catalog number, a page number, an item identifier, etc.), an original barcode value, and the period of validity (e.g., the expiration date). At the time of scanning the tag, the camera phone 102 does not need to connect to a network (e.g., the Internet) to receive any additional information. All the necessary information for coupon management and consumer profiling has been converted and stored in the tag prior to the time of scanning. It is noted that the camera phone 102 stores the keys 320 instead of the image of the tags or barcodes. Thus, the amount of storage space for storing the coupons is minimized.

Figure 4:
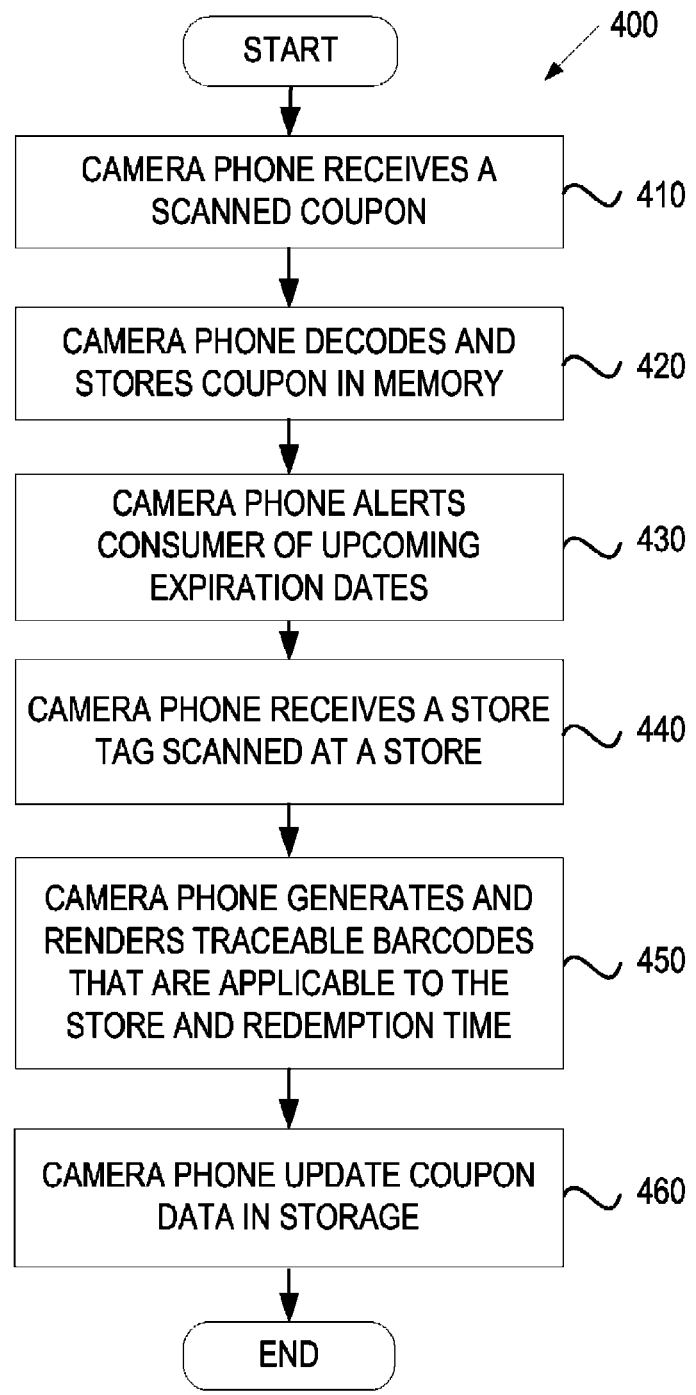
FIG. 4 illustrates a flow diagram of one embodiment of a process performed by a camera phone for coupon acquisition and redemption.

After one or more tags are scanned into the camera phone 102, a user of the camera phone 102 may carry the camera phone to the stores and use the coupons stored therein. FIG. 4 illustrates a flow diagram of one embodiment of a process 400 for acquiring, managing and redeeming coupons. The process 400 may be performed by processing logic 926 of FIG. 9 that may comprise hardware (e.g., circuitry, dedicated logic, programmable logic, microcode, etc.), software (such as instructions run on a processing device), or a combination thereof. In one embodiment, the process 400 is performed by the camera phone 102 of FIG. 1, executing the client software 125.

Referring to FIG. 4, at block 410, the process 400 begins with the camera phone 102 receiving an image of a coupon scanned by a consumer. The scan operation may be a simple "point-and-shoot" operation. The coupon may be printed in printed media. At block 420, the camera phone 102 decodes the scanned coupon by converting the unique tag in the coupon into a key. The camera phone 102 then stores the key in the memory. In some embodiments, the camera phone 102 may have forwarding capabilities to forward a coupon to another user. Thus, the current consumer may serve as a marketing agent for the issuer of the coupon. Proceeding to block 430, according to the validity information (e.g., expiration dates) in the keys, the camera phone 102 issues an automatic reminder to the consumer on the upcoming expiration date of the coupons stored in the memory. The automatic reminder may be a pop-up message shown on the camera phone 102, and may be issued anytime when the camera phone 102 is turned on. At block 440, the consumer carries the camera phone 102 to a store where the coupon may be accepted. The store displays a store tag, which includes a logo that identifies a company (e.g., Ann's Wallet.com) offering the coupon management service, and a barcode (e.g., a UPC or a QR barcode) that identifies the store. The consumer scans the store tag into the camera phone 102. The store tag may be displayed in a location that is easy to notice (e.g., at or near the cashier register). At block 450, based on the store tag and the current date/time, the camera phone 102 searches the keys stored in the memory, generates and renders, in real-time, one or more discount codes in the form of traceable barcodes that are applicable to the store and the current date/time. That is, coupons that cannot be used in this store or have already expired will not be rendered. The camera phone 102 may display the traceable barcodes in a scrollable list on the phone screen. These traceable barcodes (e.g., UPC or a QR barcodes) include all of the information in the corresponding keys, augmented with some of all of the following additional information: a unique anonymous identifier for the camera phone 102, a unique identifier for the client software 125, when the coupon was captured, when the coupon was redeemed, where the coupon was redeemed (e.g., a store identifier), the number of times the coupon has been used, an instance identifier (for enforcing one coupon per customer), etc. After a coupon is redeemed according to the process described below in FIG. 5, at block 460, the camera phone 102 updates the information stored in the memory. The process 400 then terminates until another coupon is scanned by the camera phone 102 or redeemed by the consumer.

In the update operation of block 460, two scenarios associated with the redemption of a coupon are described in greater detail. In a first scenario, the coupon can only be used once by the camera phone 102. In that case, the discount code for the coupon will no longer be shown on the camera phone display, and will be removed from memory and permanent storage. In a second scenario, the coupon can be used more than once by the camera phone 102. In that case, the camera phone 102 records the time and location of redemption into a log. Each log contains N events, one for each exercise (redemption) of the coupon. The data in the log may include coupon identifier, retail shop identifier, time/date and unique anonymous user identifier, etc. The log is maintained in the camera phone memory until the coupon expires. Once the coupon expires, the log is discarded. In an embodiment where a QR barcode is generated by the camera phone 102 for redeeming a coupon, the log for the coupon is embedded into the QR barcode. Thus, if the coupon is exercised (i+1) times, the log up to event (i) is embedded into the QR barcode. The POS computing system 106 can then scan the log-embedded QR barcode and send it to the server 104 for further processing and data mining.

Figure 5:
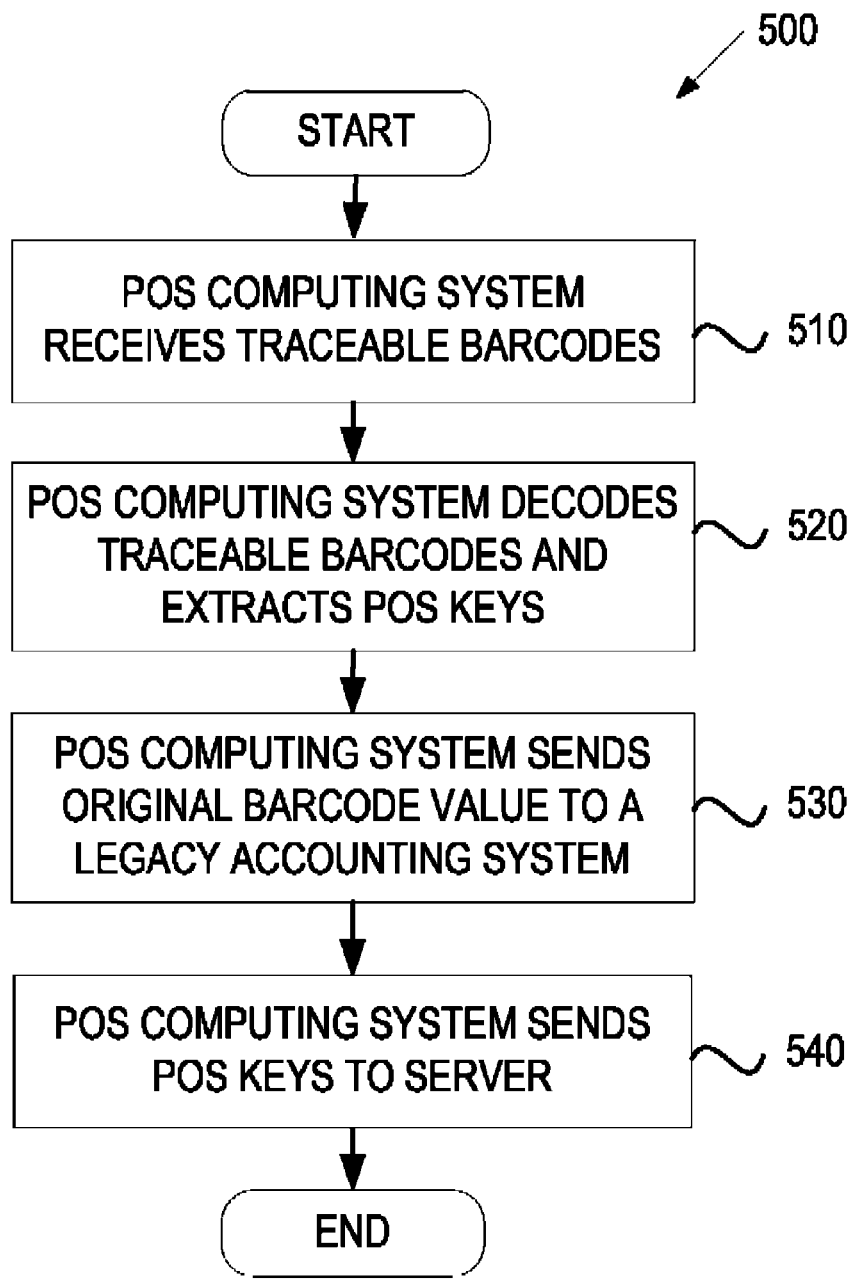
FIG. 5 illustrates a flow diagram of one embodiment of a process performed by a point-of-sale (POS) computing system for coupon redemption.

The traceable barcodes rendered by the camera phone 102 can be used as a regular discount coupon. FIG. 5 illustrates a flow diagram of one embodiment of a process 500 for a store to accept the traceable barcodes, and, in the meantime, to collect consumer profiles. The process 500 may be performed by processing logic that may comprise hardware (e.g., circuitry, dedicated logic, programmable logic, microcode, etc.), software (such as instructions run on a processing device), or a combination thereof. In one embodiment, the process 500 is performed by the POS computing system 106 of FIG. 1, executing the POS client software 165.

Referring to FIG. 5, at block 510, the process 500 begins with the POS computing system 106 receiving the traceable barcodes rendered on the display of the camera phone 102. A cashier of the store may scan the traceable barcodes using a scanner, or may input the traceable barcodes manually. At block 520, the POS computing system 106 decodes the received traceable barcodes, and extracts POS keys from the decoded barcodes. Similar to the keys 320 of FIG. 3, the POS keys are a set of structured values that include the information provided by the corresponding keys and additional information in the traceable barcodes (e.g., a unique anonymous identifier for the camera phone 102, a unique identifier for the client software 125, when the coupon was captured, when the coupon was redeemed, where the coupon was redeemed, the number of times the coupon has been used, an instance identifier, etc.). At block 530, the POS computing system 106 sends the original barcode values contained in the POS keys to the legacy accounting system 167, which performs conventional accounting operations. It is noted that the technique described herein introduces no change to a conventional account system. At block 540, the POS computing system 106 sends the POS keys to a server (e.g., the server 104 of FIG. 1) that performs consumer preference tracking and data mining. The process 500 then terminates until a new traceable barcode is presented to the POS computing system 106.

Figure 6:
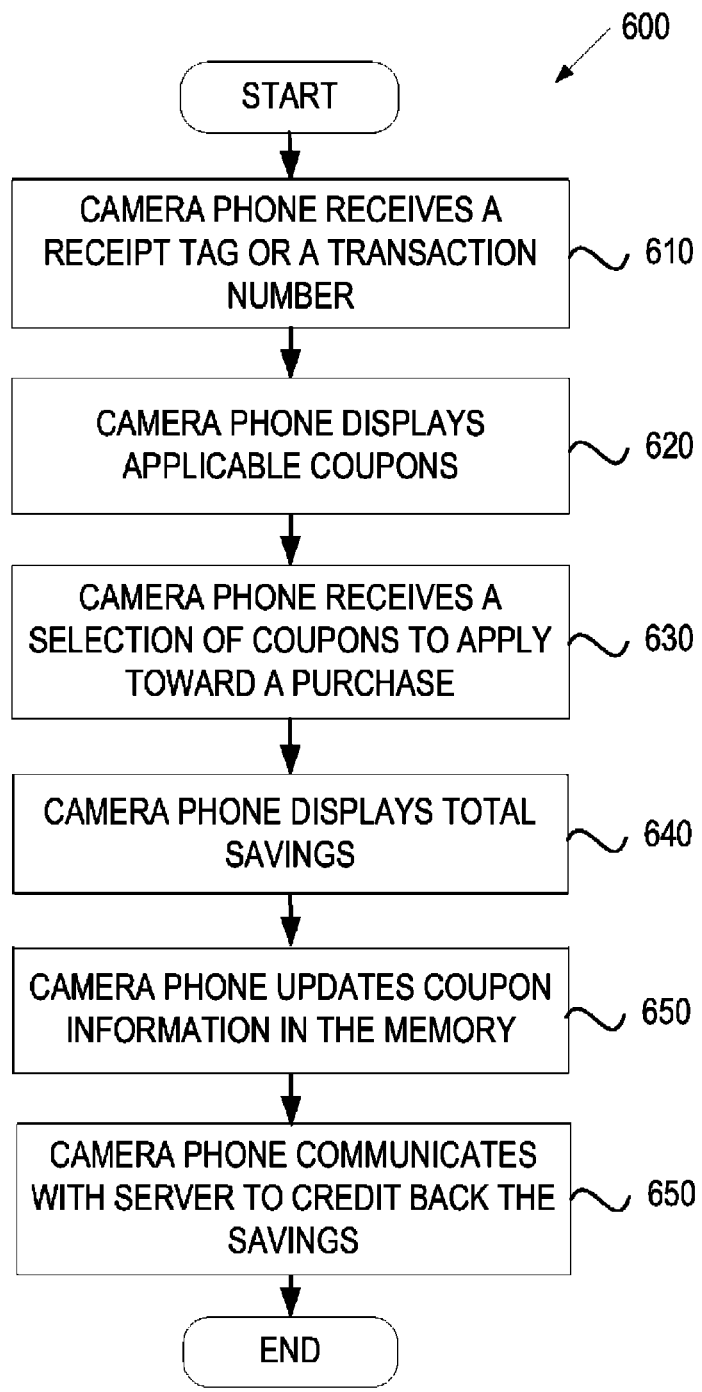
FIG. 6 illustrates a flow diagram of one embodiment of a process for coupon redemption after a purchase has been made.

In an alternative scenario, the redemption of discount coupons may occur after (e.g., within a predetermined hours or days) a sales item has been purchased. FIG. 6 illustrates a flow diagram of one embodiment of a process 600 for this alternative scenario. The process 600 may be performed by processing logic 926 of FIG. 9 that may comprise hardware (e.g., circuitry, dedicated logic, programmable logic, microcode, etc.), software (such as instructions run on a processing device), or a combination thereof. In one embodiment, the process 600 is performed by the camera phone 102 of FIG. 1, executing the client software 125.

At block 610, a consumer may use the camera phone 102 to scan a receipt tag printed on the receipt of the sales item, or to manually input a transaction number on the receipt. The receipt tag can be the same or similar to a store tag; that is, it includes a logo that identifies a company (e.g., Ann's Wallet.com) offering the coupon management service, and a barcode (e.g., a UPC or a QR barcode) that identifies the store at which the receipt was issued. The receipt tag may identify itself as a receipt, or the consumer may choose a "receipt mode" of the client software 125. At block 620, after the camera phone 102 reads the receipt tag, the camera phone 102 automatically selects eligible coupons and displays a scrollable list of the coupons based on the current date/time, the store, etc. The display may include description of the coupons only, without showing the traceable barcodes. At block 630, the consumer chooses one or more of the displayed coupons and applies them to the transaction shown on the receipt. At block 640, the camera phone 102 displays the total saving amount from the coupons, and at block 650, updates the information in the memory regarding which coupons have been used by the consumer. At block 660, the camera phone 102 communicates with the legacy accounting system 167 (of FIG. 1) of the store to credit back the savings to the consumer's account. It is noted that the operation of block 660 may be performed through the server 104 (of FIG. 1) with wireless data connectivity, short message service (SMS), or a connection to a computer that has access to the Internet. The process 600 then terminates until a next receipt is presented to the camera phone 102 for coupon redemption.

In the operation of block 660, the camera phone 102 may need to establish data connectivity with a remote computing facility. However, the amount of data transmission in the operation is minimal and can be performed anytime after the coupons are applied. Thus, the convenience offered by this alternative process vastly outweighs the minimal data transmission incurred during the process. It is noted that the process 600 is an optional feature of the technique described herein. Thus, in an embodiment where data connectivity is not feasible, the redemption of coupons may be performed according to the operations described in FIG. 4.

The ability of a camera phone to scan coupons as structured data, as described above, enables coupons to become a much more powerful direct marketing tool than they traditionally were. Consumers will have a much better experience of using the coupons, and will be more prone to increase their use of coupons as well as share their experience with others. The latter is a crucial component needed to leverage on the Web culture of early adopters and opinion leaders.

Figure 7:
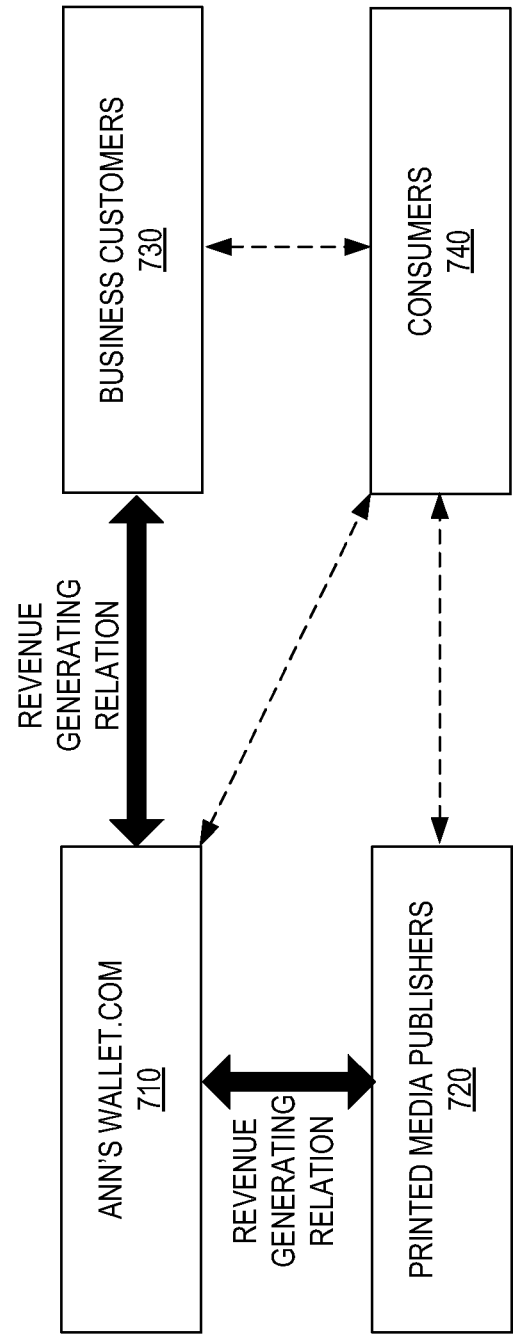
FIG. 7 illustrates a block diagram of a service based business scenario.
Figure 8:
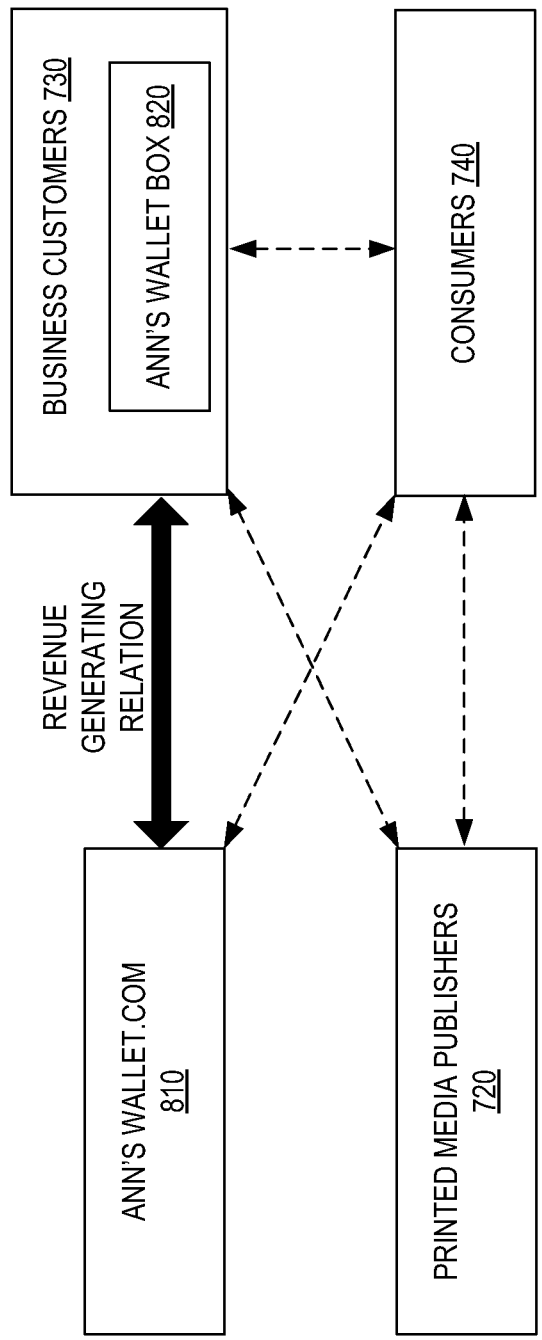
FIG. 8 illustrates a block diagram of a box based business scenario.

FIGS. 7 and 8 show examples of two business scenarios upon which embodiments of the invention can be modeled. The first scenario is service based, and the second scenario is box based. In the two scenarios, a number of business entities are involved. These business entities include an Ann's Wallet.com 710, printed media publishers 720, business customers 730, and consumers 740.

Referring to the service based business scenario of FIG. 7, Ann's Wallet.com 710 is an online service provider that provides access to tools for barcodes encoding/decoding, data collection and storage, and management of consumer preference information. The printed media publishers 720 include a company that publishes printed media that print coupons. For example, the printed media publisher 720 may be the publishers of a mail catalog or a weekend edition of a local newspaper. The printed media publishers 720 may be one of the sources of revenue for Ann's Wallet.com 710, as it may pay for the services provided by Ann's Wallet.com 710 in return for access to consumer preference information. This consumer preference information can be used to better target the audience/readers of the printed media, increase subscription or circulation in the case of newspapers and magazines. The business customers 730 include a company that uses the printed media publishers 730 to advertise their products. The business customers 730 may pay Ann's Wallet.com 710 for access to Ann's Wallet.com services and products. The consumers 740 include a person with a camera phone that is reached by the printer media publishers 720.

In the service based business scenario of FIG. 7, Anne's Wallet.com 710 establishes a web presence that provides access to coupon barcode generation (encoding/decoding) tools, barcode ID management, as well as tracking data collection, storage and mining. Anne's Wallet.com 710 also allows the consumers 740 to download and install a free thin client software (e.g., the client software 125 of FIG. 1) for their camera phones (e.g., the camera phones 102). The free thin client software enables the camera phones to scan, store and manage the consumer's choice of coupons. In one embodiment, Anne's Wallet.com 710 may be hosted by the server 104 of FIG. 1. As described above, both of the printed media publishers 720 and the business customers 730 may pay Ann's Wallet.com 710 for access to Ann's Wallet.com services and products.

Referring to the box based business scenario of FIG. 8, an Ann's Wallet.com 810 may be deployed on the Web for the sole purpose of distributing the thin client software to the consumers 740. The other functionalities, as described in connection with FIG. 7, may be packaged into an Ann's Wallet box 820 that can be purchased and installed by the business customers 730 behind their firewalls. Thus, the business customers 730 own their data completely. In this scenario, Anne's Wallet.com 810 may be hosted by the server 104 of FIG. 1 that includes the Web application 142. The data collector 144 and the tag generator 146 reside in the Ann's Wallet box 820 installed by the business customers 730. This box based business scenario leverages on existing sale channels and relies on maintenance fees for recurring revenues. Further, this scenario opens the door to more consulting opportunities for service engineers who would assist the business customers in deploying the Ann's Wallet box 820.

In FIGS. 7 and 8, one of the business customers 730 may post advertisements next to relevant or competitor's coupons. For example, when the consumer 740 purchases a pair of shoes in a store, the thin client software on the camera phone can pull out not only the applicable coupons for that store, but also a coupon for a nearby store that sells the shoes for less money. Alternatively, as an example of non-competitive advertising, the camera phone can pull out an advertisement for a nearby gym.

Based on the coupon management techniques described above, a retailer may run a marketing campaign, referred to as a "treasure hunt," to attract more consumers to its store. During the days of treasure hunt, a certain number of movable signs with the store tag can be placed in areas where the shopkeeper would like to increase traffic (e.g., house wares, men's shoes and jewelry). A sign at the entrance may announce the hunt and the number of hidden store tags. Consumers would wander the store to hunt for the store tags, and acquire the tags with their camera phones. Once the consumers collect all of the tags, their phones would inform them that they have completed the mission, and they now have a 40% (for example) discount applicable for anything they buy at the store that day. Collaboration among consumers can be encouraged. Thus, consumers can meet, split up to hunt for tags and share the tags via their cell phones. In the end, all of the participants can eventually benefit from completing the hunt.

Figure 9:
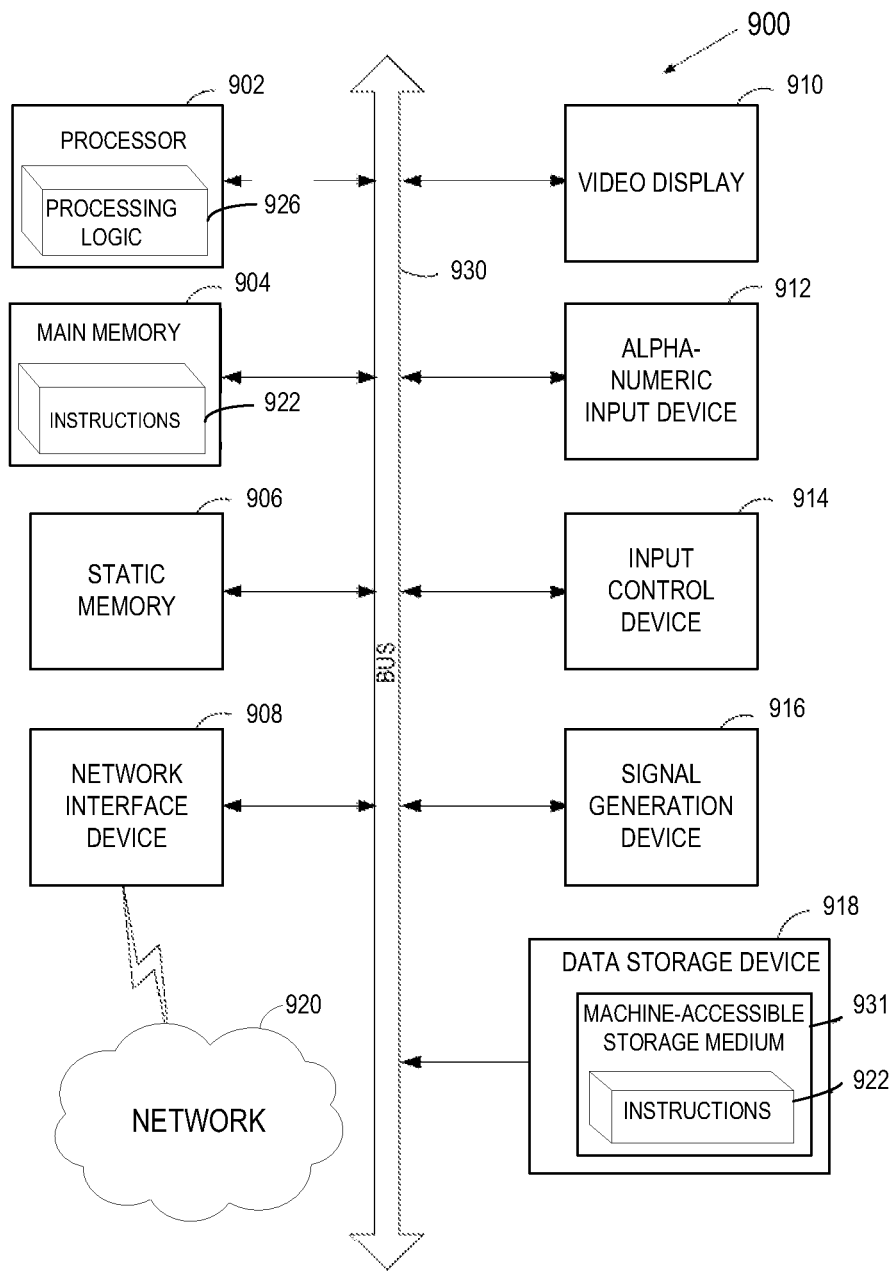
FIG. 9 illustrates a block diagram of an exemplary portable computing system implementing some embodiments of the present invention.

FIG. 9 illustrates a diagrammatic representation of a machine in the exemplary form of a portable computing system 900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, the Internet, a Public Switched Telephone Network (PSTN), and/or a wireless telephone network. In one embodiment, the portable computing system 900 may be a camera phone (e.g., the camera phone 102 of FIG. 1).

The exemplary portable computing system 900 includes a processor 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 902 is configured to execute the processing logic 526 for performing the operations and steps discussed herein.

The portable computing system 900 may further include a network interface device 908. The portable computing system 900 also may include a video display unit 910 (e.g., a liquid crystal display (LCD) or a cathode ray tube (CRT)), an alphanumeric input device 912 (e.g., a keyboard), a input control device 914 (e.g., a stylus), and a signal generation device 916 (e.g., a speaker).

The secondary memory 918 may include a machine-readable storage medium (or more specifically a computer-readable storage medium) 931 on which is stored one or more sets of instructions (e.g., software 922) embodying any one or more of the methodologies or functions described herein. The software 922 may also reside, completely or at least partially, within the main memory 904 and/or within the processor 902 during execution thereof by the portable computing system 900, the main memory 904 and the processing device 902 also constituting machine-readable storage media. The software 922 may further be transmitted or received over a network 920 via the network interface device 908.

The machine-readable storage medium 931 may also be used to store the client software 125 of FIG. 1. While the machine-readable storage medium 931 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method, system and computer program product for using a portable computing device that has a built-in camera and a display for coupon managements have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method, comprising:
scanning, by a camera of a portable computing device, a first machine readable code associated with a coupon;
decoding, by a processor of the portable computing device, a scanned image of the first machine readable code to obtain coupon data for redemption of the coupon and additional information that identifies at least an issuer of the coupon and a publication on which the coupon is printed, wherein the coupon data and the additional information are stored in a memory of the portable computing device;
scanning, by the camera of the portable computing device, at least one of a plurality of machine readable store tags that are displayed in multiple locations in a store, each of the machine readable store tags encoding data identifying the store;
based on the at least one scanned store tag and decoded data stored in the memory of the portable computing device, generating a second machine readable code for redemption of the coupon, wherein the second machine readable code is different from the first machine readable code and comprises the data identifying the store, the coupon data, and the additional information; and
rendering a list of machine readable codes on a display of the portable computing device, the machine readable codes in the list generated from machine readable codes that were previously scanned into the portable computing device and are applicable to the store, wherein the list includes the second machine readable code.

2. The method of claim 1, wherein the portable computing device is a camera phone.

3. The method of claim 1, wherein rendering the list of machine readable codes further comprises:
rendering the machine readable codes indicating the coupons that are applicable to a current time.

4. The method of claim 1, wherein decoding the scanned image further comprises:
generating the second machine readable code to include information from the coupon data decoded from the first machine readable code and additional information for anonymous user profiling.

5. The method of claim 1, further comprising:
generating an alert to indicate an upcoming expiration date of the coupon.

6. The method of claim 1, wherein decoding a scanned image of the first machine readable code for storage further comprises:
generating a set of structured values that identifies at least the issuer of the coupon, the publication on which the coupon is printed, and the coupon data; and
storing the set of structured values as one of a plurality of different keys in the memory, each key being associated with a plurality of different sales items.

7. The method of claim 1, further comprising:
updating an event log of the coupon stored in the portable computing device after the coupon is redeemed; and
embedding the event log into a third machine readable code, which is displayed by the portable computing device when the coupon is redeemed again.

8. The method of claim 1, further comprising:
displaying a listing of coupons that are applicable to the store and a redemption time based on information printed on a receipt of a purchase;
receiving a selection of the coupons for the purchase; and
redeeming the selection of the coupons with the portable computing device.

9. The method of claim 1, further comprises:
displaying additional information of related merchandise or stores next to the information of the coupon.

10. The method of claim 1, wherein the portable computing device is a member of a collaborating group of portable computing devices that share scanned store tags, the method further comprising:
receiving at least one additional scanned store tag from at least one other portable computing device in the collaborating group; and
informing a user of the portable computing device that the user is eligible to receive a discount on a purchase when the portable computing device collects all of the store tags scanned from the multiple locations.

11. A system of a portable computing device, comprising:
a camera to scan an image of a first machine readable code associated with a coupon from a printed publication and to scan at least one of a plurality of machine readable store tags that are displayed in multiple locations in a store, each of the machine readable store tags encoding data identifying the store;

a processor to decode the scanned image of the first machine readable code to obtain coupon data and additional information that identifies at least an issuer of the coupon and a publication on which the coupon is printed, wherein the coupon data and the additional data are for storage in the portable computing device for redemption of the coupon, and based on the at least one scanned store tag and decoded data in the storage, to generate a second machine readable code, different from the first machine readable code and comprises the data identifying the store, the coupon data, and the additional information, for redemption of the coupon and render a list of machine readable codes generated from machine readable codes associated with coupons that were previously scanned into the portable computing device and are applicable to the store; and a display to display the barcodes rendered by the processor, wherein the camera, the processor and the display are integrated into the portable computing device.

12. The system of claim 11, wherein the portable computing device is a camera phone.

13. The system of claim 11, wherein the system further comprises:

memory to store a set of structured values decoded from at least a portion of the scanned image of the coupon, the set of structured values to identify at least the issuer of the coupon, the printed publication on which the coupon is printed, and the coupon data, wherein the set of structured values are stored in the memory as one of a plurality of different keys in the memory, each key being associated with a plurality of different sales items.

14. The system of claim 11, wherein the machine readable codes are rendered based on a current time.

15. The system of claim 11, wherein the machine readable codes include information for anonymous consumer profiling.

16. The system of claim 11, wherein the processor is to generate an alert to indicate an upcoming expiration date of the coupons.

17. A non-transitory computer-readable storage medium including instructions that, when executed by a processing system, cause the processing system to perform a method comprising:

scanning, by a camera of a portable computing device, a first machine readable code associated with a coupon;

decoding, by a processor of the portable computing device, a scanned image of the first machine readable code to obtain coupon data for redemption of the coupon and additional information that identifies at least an issuer of the coupon and a publication on which the coupon is printed, wherein the coupon data and the additional information are stored in a memory of the portable computing device;

scanning, by the camera of the portable computing device, at least one of a plurality of machine readable store tags that are displayed in multiple locations in a store, each of the machine readable store tags encoding data identifying the store;

based on the at least one scanned store tag and decoded data stored in the memory of the portable computing device, generating a second machine readable code for redemption of the coupon, wherein the second machine readable code is different from the first machine readable code and comprises the data identifying the store, the coupon data, and the additional information; and rendering a list of machine readable codes on a display of the portable computing device, the machine readable codes in the list generated from machine readable codes that were previously scanned into the portable computing device and are applicable to the store, wherein the list includes the second machine readable code.

18. The computer-readable storage medium of claim 17, wherein rendering a list of machine readable codes further comprises:

rendering the machine readable codes applicable to a current time.

19. The computer-readable storage medium of claim 17, wherein decoding the scanned image further comprises:

generating the second machine readable code to include information from the coupon data decoded from the first machine readable code and additional information for anonymous user profiling.

20. The computer readable storage medium of claim 17, wherein the method further comprises:

generating an alert to indicate an upcoming expiration date of the coupon.

21. The computer readable storage medium of claim 17, wherein decoding the scanned image further comprises:

generating a set of structured values that identifies at least the issuer of the coupon, the publication on which the coupon is printed, and the coupon data; and storing the set of structured values as one of a plurality of different keys in the memory, each key being associated with a plurality of different sales items.

22. The computer readable storage medium of claim 17, further comprising:

displaying a listing of coupons that are applicable to the store and a redemption time based on information printed on a receipt of a purchase;

receiving a selection of the coupons for the purchase; and redeeming the selection of the coupons.

* * * * *